United States Patent Office 3,646,035
Patented Feb. 29, 1972

3,646,035
1-PHENYL-4-PYRROLINYLPIPERAZINES AND
RELATED COMPOUNDS
Fred M. Hershenson, Evanston, Ill., assignor to
G. D. Searle & Co., Chicago, Ill.
No Drawing. Filed Feb. 16, 1970, Ser. No. 11,842
Int. Cl. C07d 51/70
U.S. Cl. 260—268 PH
7 Claims

ABSTRACT OF THE DISCLOSURE 1-phenylpiperazines having a pyrrolinyl, tetrahydropyridyl, or tetrahydroazepinyl substituent at the 4-position are described herein. They possess antibacterial, antiprotozoal, anthelmintic, anti-fungal, and anti-algal activity. The compounds are prepared by the reaction of a 1-phenylpiperazine with the appropriate imido ester.

The present invention relates to 1-phenyl-4-pyrrolinylpiperazines and compounds related thereto. More particularly, it relates to a group of compounds having the following general formula

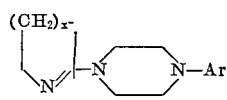

wherein $x$ is whole number between 1 and 3 inclusive; and Ar is selected from the group consisting of phenyl, tolyl, halophenyl, methoxyphenyl, and pyridyl. The halophenyl radicals referred to above include fluorophenyl, chlorophenyl, bromophenyl, and iodophenyl.

The organic bases of this invention form pharmaceutically acceptable salts with a variety of inorganic and strong organic acids. Such salts are formed with acids such as sulfuric, phosphoric, hydrochloric, hydrobromic, hydiodic, sulfonic, citric, lactic, maleic, malic, succinic, tartaric, cinnamic, acetic, benzoic, gluconic, ascorbic, and related acids.

The compounds of the present invention are prepared by the reaction of a 1-substituted piperazine with an imido ester of the following formula

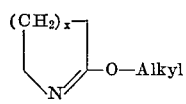

wherein $x$ is a whole number between 1 and 3 inclusive and alkyl is preferably methyl. The reaction is carried out with heating at about 60–80° C. for several days. Thus, the reactants can be heated together at the indicated temperature without a solvent or the reaction can be carried out in an inert solvent such as benzene or chloroform at reflux.

The present compounds are useful as analgesics. They are also useful as anti-biotic agents against a variety of organisms. Thus, they inhibit the growth of bacteria such as *Bacillus subtilis*, *Escherichia coli*, *Salmonella paratyphi* A, and an *Erwinia* species; protozoa such as *Tetrahymena pyriformis*, nematodes such as *Turbatrix aceti*, fungi such as *Trichophyton mentagrophytes* and *Verticillium alboatrum*, and algae such as *Chlorella vulgaris*. The present compounds can thus be combined with various known excipients and adjuvants in the form of dusts, solutions, suspensions, ointments, and sprays to provide compositions useful for disinfecting purposes.

The anthelmintic utility of the instant compounds is demonstrated by a standard test for their capacity to immobilize *Turbatrix aceti*, a representative nematode. In this test, a washed suspension of *Turbatrix aceti* containing approximately 2000 nematodes per ml. is prepared in distilled water, whereupon 1 ml. of the suspension is mixed with 10 mg. of test compound. The mixture is incubated at room temperature for 48 hours and then examined grossly for the presence of motile worms. If any are observed, the compound is considered inactive. If no motile worms are observed, 0.1 ml. of the incubated mixture is serially diluted and mixed with a freshly-prepared suspension of the nematode to produce concentrations of 1000, 100, 10, and 1 mcgm. of test compound per ml. and the resultant mixtures are incubated as before at room temperature for 48 hours and then examined grossly for the presence of motile worms. Controls are provided by concurrent incubations identical with the foregoing except for the absence of test compound.

The following examples are presented to further illustrate the present invention; they should not be construed as limiting it in spirit or in scope. In these examples, temperatures are indicated in degrees centigrade (° C.) and quantities are indicated in parts by weight unless parts by volume are specified. The relationship existing between parts by weight and parts by volume is the same as that existing between grams and milliliters.

EXAMPLE 1

A mixture of 4.0 parts of 2-methoxy-1-pyrroline and 6.5 parts of 1-phenylpiperazine is heated in a stoppered flask at 65° C. for 65 hours. The mixture is cooled to room temperature and the solid which precipitates is separated by filtration, washed with cold hexane and then recrystallized from hexane to give 1-phenyl-4-(1-pyrrolin-2-yl)piperazine melting at about 103–105.5° C. This compound is converted to the salt by dissolving it in ether and bubbling in dry hydrogen chloride gas. The white precipitate which forms is separated by filtration, washed with ether, and recrystallized from a mixture of ethanol and ether to give 1-phenyl-4-(1-pyrrolin-2-yl)-piperazine hydrochloride melting at about 229–231° C. The free base of this compound has the following formula

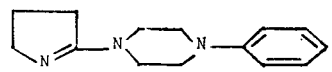

EXAMPLE 2

A solution of 5.4 parts of 1-(2-chlorophenyl)piperazine dihydrochloride and 4.0 parts of 2-methoxy-1-pyrroline in 150 parts of chloroform is refluxed for 96 hours. The reaction mixture is filtered hot to remove some insoluble material and the solvent is evaporated under reduced pressure. The resulting residue crystallizes and is triturated with acetone, separated by filtration, and washed with several portions of acetone. It is then recrystallized from acetone to give 1-(2-chlorophenyl)-4-(1-pyrrolin-2-yl)piperazine hydrochloride melting at about 207–208.5° C.

EXAMPLE 3

A mixture of 2.7 parts of 1-(3-chlorophenyl)piperazine dihydrochloride and 75 parts by volume of aqueous 15% sodium carbonate solution is stirred at 25° C. for 10 minutes and then extracted with chloroform. The chloroform extracts are dried over sodium sulfate and concentrated under reduced pressure to about 50 parts by volume. To the resulting solution is added 2.0 parts of 2-methoxy-1-pyrroline and the mixture is refluxed for 96 hours and then allowed to stand at room temperature for 65 hours. The solvent is removed under reduced pressure to leave a residual brown oil which solidifies on standing at room temperature. The resulting solid is dissolved in 52 parts of ether and 4 parts of ethanol and dry hydrogen chloride gas is bubbled through the solution for 30 minutes. It is then recrystallized from ethanol and dissolved in 5 parts of water. 18 parts of concentrated hydrochloric acid is added to the aqueous solution and the resulting solution is evaporated to dryness under reduced pressure. The solid residue is washed several times with acetone to give 1-(3-chlorophenyl)-4-(1-pyrrolin-2-yl)-piperazine dihydrochloride hemihydrate melting at about 222–224° C.

EXAMPLE 4

A mixture of 5.4 parts of 1-(4-chlorophenyl)piperazine dihydrochloride and 100 parts by volume of aqueous 15% sodium carbonate solution is stirred at room temperature for 15 minutes and then extracted with chloroform. The chloroform extract is dried over sodium sulfate and the solvent is evaporated. To the residue is added a solution of 4.0 parts of 2-methoxy-1-pyrroline in 75 parts of chloroform and the mixture is refluxed for 65 hours. It is then allowed to stand at room temperature for 65 hours and the solvent is evaporated under reduced pressure. The residual tan solid is recrystallized from cyclohexane to give 1-(4-chlorophenyl) - 4 - (1-pyrrolin-2-yl)piperazine melting at about 152–153° C.

If the above procedure is repeated using an equivalent quantity of 1-(4-fluorophenyl)piperazine and 1-(4-bromophenyl)piperazine in place of the 1-(4-chlorophenyl)piperazine, the products obtained are, respectively, 1 - (4-fluorophenyl)-4-(1-pyrrolin - 2 - yl)piperazine and 1-(4-bromophenyl)-4-(1-pyrrolin-2-yl)piperazine.

EXAMPLE 5

A solution of 4.0 grams of 1(4-chlorophenyl)-4-(1-pyrrolin-2-yl)piperazine in 1:3 methanol-ether is mixed with ether saturated with hydrogen chloride gas. The mixture is cooled and the precipitated solid is separated by filtration, washed with ether, and recrystallized from methanol-ether. The solid is then dissolved in 10 parts of water and 18 parts of concentrated hydrochloric acid is added. This mixture is evaporated to dryness under reduced pressure and the residual solid is washed several times with acetone and then dried in the air before it is recrystallized from 2 - propanol to give 1-(4-chlorophenyl)-4-(1-pyrrolin-2-yl)piperazine dihydrochloride monohydrate melting at about 220–223° C.

EXAMPLE 6

A mixture of 5.0 parts of 1-(2-tolyl)piperazine dihydrochloride in 100 parts by volume of aqueous 15% sodium carbonate solution is stirred at 25° C. for 15 minutes and then extracted with chloroform. The chloroform extract is dried and concentrated to a volume of about 50 parts. To this solution is added 4.0 parts of 2-methoxy-1-pyrroline and the mixture is refluxed for 120 hours. It is then cooled somewhat and the solvent is evaporated under reduced pressure. The residue is dissolved in ether and dry hydrogen chloride gas is passed into the solution. The precipitate which forms is separated by filtration, washed with ether and recrystallized twice from a mixture of ethanol and ether. The precipitate which forms is separated by filtration to give 1-(2-tolyl)-4-(1-pyrrolin-2-yl)piperazine dihydrochloride melting at about 224–229° C.

The solvent is evaporated from the mother liquor in the second crystallization above and the residue obtained is recrystallized from acetone and dried under reduced pressure at 100° C. for 3 hours to give 1-(2-tolyl)-4-(1-pyrrolin-2-yl)piperazine hydrochloride melting at about 185–186.5° C.

EXAMPLE 7

A mixture of 5.0 parts of 1-(3-tolyl)piperazine dihydrochloride and 100 parts by volume of aqueous 15% sodium carbonate solution is extracted with chloroform and the combined extracts are dried over sodium sulfate and concentracted under reduced pressure to a volume of 50 parts. To this solution is added 4.0 parts of 2-methoxy-1-pyrroline and the resultant orange solution is refluxed for 96 hours. It is then allowed to stand at room temperature for 65 hours and the solvent is evaporated under reduced pressure. The residue crystallizes into a tan solid and is recrystallized from hexane to give 1-(3-tolyl)-4-(1-pyrrolin-2-yl)piperazine melting at about 95–96° C.

EXAMPLE 8

The procedure of Example 7 is repeated using 5.0 parts of 1-(4-tolyl)piperazine dihydrochloride and 4.0 parts of 2-methoxy-1-pyrroline. The mixture is refluxed for 4 days and the solvent is evaporated to leave a residue which is recrystallized from hexane to give 1-(4-tolyl)-4-(1 - pyrrolin - 2 - yl)piperazine melting at about 114–115.5° C.

EXAMPLE 9

A solution of 5.3 parts of 1 - (3 - methoxyphenyl)-piperazine dihydrochloride in 100 parts by volume of aqueous 15% sodium carbonate solution is stirred at room temperature for 1 hour and then extracted with chloroform. The chloroform extracts are combined and the solvent is evaporated to leave a residual brown oil. This is dissolved in 75 parts of chloroform, mixed with 4.0 parts of 2-methoxy-1-pyrroline and refluxed for 120 hours. It is then allowed to stand at room temperature for 65 hours before the solvent is evaporated under reduced pressure. The residual oil solidifies and is recrystallized from hexane to give 1-(3-methoxyphenyl)-4-(1-pyrrolin-2-yl)-piperazine melting at about 79–82° C.

EXAMPLE 10

A solution of 4.0 parts of 2-methoxy-1-pyrroline and 5.3 parts of 1-(4-methoxyphenyl)piperazine dihydrochloride in 110 parts of chloroform is allowed to stand at room temperature for 45 minutes. It is then filtered to remove some precipitate and the filtrate is refluxed for 50 hours. It is then cooled and the solvent is evaporated under reduced pressure. The residue solidifies somewhat and is triturated with ether and then dissolved in acetonitrile. The solid which precipitates from the acetonitrile on cooling is removed and the solvent is evaporated from the residue. This is triturated with acetone and then recrystallized from boiling acetone to give 1-(4-methoxyphenyl) - 4 - (1-pyrrolin-2-yl)piperazine hydrochloride melting at about 163–164° C.

EXAMPLE 11

A solution of 6.5 parts of 1-(2-pyridyl)piperazine and 7.9 parts of 2-mehtoxy-1-pyrroline in 50 parts of chloroform is refluxed for 72 hours. The mixture is then cooled and the solvent is evaporated under reduced pressure. The residual light brown solid is recrystallized twice from hexane to give 1-(2-pyridyl)-4-(1-pyrrolin-2-yl)piperazine melting at about 101–102.5° C. This compound has the following formula

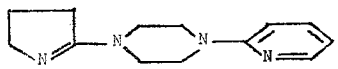

EXAMPLE 12

A solution of 5.1 parts of 7-methoxy-3,4,5,6-tetrahydro-2H-azepine and 6.5 parts of 1 - phenylpiperazine is heated at 75° C. for 65 hours. The mixture is cooled to room temperature and the precipitate which forms is separated by filtration, triturated with water, filtered, and dried. The solid is then heated at 200° C. in an oil bath under reduced pressure and a small amount of material distills off. The residue is then cooled and dissolved in ether and dry hydrogen chloride gas is passed through the ether solution. The precipitate which forms is separated by filtration and recrystallized from a mixture of methanol and ether to give 1-phenyl-4-(3,4,5,6-tetrahydro - 2H-azepin-7-yl)piperazine dihydrochloride melting at about 242–245° C. The free base of this compound has the following formula

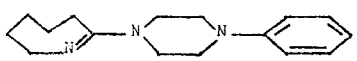

EXAMPLE 13

8.0 parts of 1 - (3 - tolyl)piperazine dihydrochloride monohydrate is added to 85 parts by volume of aqueous 10% sodium carbonate solution. The precipitate which forms is separated by filtration and dissolved in benzene and the benzene solution is washed with water and dried over sodium sulfate. The benzene solution is then added to 5.7 parts of 7-methoxy-3,4,5,6-tetrahydro-2H-azepine and the solution is refluxed for 65 hours. The solvent is then evaporated under reduced pressure and the residue is dissolved in ether and added to 70 parts of ether which has been saturated with hydrogen chloride gas. The precipitate which forms is crushed to a fine powder and the ether is decanted. The solid is then heated in acetonitrile for 10 minutes, filtered, and washed with acetonitrile and ether. It is then recrystallized from N,N-dimethylformamide and acetone and then from a mixture of ethanol and ether to give 1 - (3-tolyl)-4-(3,4,5,6-tetrahydro - 2H-azepin-7-yl)piperazine dihydrochloride melting at about 232–234° C.

EXAMPLE 14

5.3 parts of 1-(2-methoxyphenyl)piperazine dihydrochloride is dissolved in 100 parts by volume of aqueous 10% sodium carbonate solution. The resulting mixture is extracted with chloroform and the combined chloroform extracts are dried over anhydrous sodium sulfate and filtered and the solvent is evaporated under reduced pressure. To the resulting residue is added a solution of 5.1 parts of 7-methoxy-3,4,5,6-tetrahydro-2H-azepine in 67 parts of benzene. The resulting solution is refluxed for 48 hours and then cooled to room temperature. The solvent is then evaporated under reduced pressure and the orange residue is dissolved in ether and added to 85 parts of ether which has been saturated with hydrogen chloride. The precipitate forms is washed with ether and heated in boiling acetone for 1 hour. Insoluble material is separated by filtration and recrystallized from acetonitrile to give 1-(2-methoxyphenyl)-4-(3,4,5,6-tetrahydro-2H - azepin - 7-yl)piperazine dihydrochloride melting at about 205–205.5° C. with decomposition.

EXAMPLE 15

The procedure of Example 14 is repeated using 1-(3-methoxyphenyl)piperazine dihydrochloride in place of the 1 - (2 - methoxyphenyl)piperazine dihydrochloride. The reaction mixture is refluxed for 110 hours and the crude product is isolated and converted to the hydrochloride salt as in Example 14. The crude hydrochloride salt is recrystallized from a mixture of ethanol and ether to give 1 - (3 - methoxyphenyl) - 4-(3,4,5,6-tetrahydro-2H-azepin-7-yl)piperazine dihydrochloride melting at about 216.5° C. with decomposition.

EXAMPLE 16

The procedure of Example 14 is repeated using 5.3 parts of 1-(4-methoxyphenyl)piperazine hydrochloride and 5.1 parts of 7-methoxy-3,4,5,6-tetrahydro-2H-azepine. The crude residue obtained after evaporation of the reaction solvent is triturated with water and then recrystallized from cyclohexane to give 1-(4-methoxyphenyl)-4- (3,4,5,6-tetrahydro-2H-azepin-7-yl)piperazine melting at about 96.5–99.5° C. To a solution of 2.0 parts of this compound in 35 parts of ether there is added 70 parts of ether which has been saturated with hydrogen chloride gas. The precipitate which forms is separated by filtration and washed with ether. It is allowed to stand in the air for 65 hours, recrystallized from a mixture of ethanol and ether, and then dried for 2 hours at 65° C. under reduced pressure to give 1-(4-methoxyphenyl)-4-(3,4,5,6 - tetrahydro - 2H-azepin-7-yl)piperazine dihydrochloride hydrate.

EXAMPLE 17

If the procedure of Example 1 is repeated using an equivalent quantity of 6 - methoxy - 2,3,4,5-tetrahydropyridine in place of the 2-methoxy-1-pyrroline, the product is 1-phenyl-4-(2,3,4,5-tetrahydro-2-pyridyl)piperazine.

What is claimed is:

1. A compound of the formula

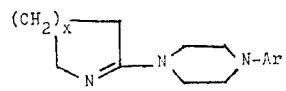

wherein $x$ is a whole number between 1 and 3 inclusive; and Ar is selected from the group consisting of phenyl, tolyl, halophenyl, methoxyphenyl, and pyridyl.

2. A compound according to claim 1 which has the formula

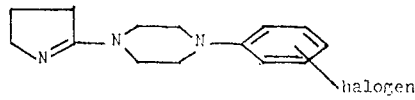

3. A compound according to claim 1 which is 1-(2-chlorophenyl)-4-(1-pyrrolin-2-yl)piperazine.

4. A compound according to claim 1 which is 1-(4-chlorophenyl)-4-(1-pyrrolin-2-yl)piperazine.

5. A compound according to claim 1 which is 1-(4-tolyl)-4-(1-pyrrolin-2-yl)piperazine.

6. A compound according to claim 1 which is 1-(3-tolyl)-4-(3,4,5,6-tetrahydro-2H-azepin-7-yl)piperazine.

7. A compound according to claim 1 which is 1-(3-methoxyphenyl) - 4 - (3,4,5,6-tetrahydro-2H-azepin-7-yl) piperazine.

References Cited

UNITED STATES PATENTS

| | | | |
|---|---|---|---|
| 2,543,972 | 3/1951 | Hultquist et al. | 260—268 PH |
| 2,562,036 | 7/1951 | Hultquist et al. | 260—268 PH |
| 3,250,771 | 5/1966 | Leonard | 260—268 PH |

DONALD G. DAUS, Primary Examiner

U.S. Cl. X.R.

260—239 B, 268 H, 326.5 H, 999

UNITED STATES PATENT OFFICE
CERTIFICATE OF CORRECTION

Patent No. 3,646,035                    Dated February 29, 1972

Inventor(s) Fred M. Hershenson

It is certified that error appears in the above-identified patent and that said Letters Patent are hereby corrected as shown below:

Column 1, first formula

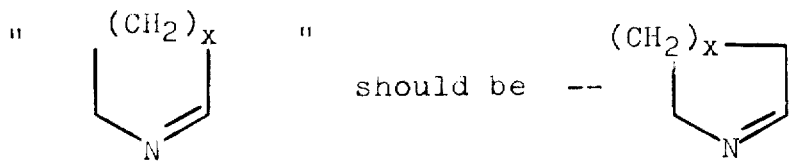

Column 4, line 46, "mehtoxy" should be -- methoxy --;

Column 5, line 37, "precipitate forms" should be -- precipitate which forms --; and Claim 4, line 1, "compocnd" should be -- compound --.

Signed and sealed this 5th day of December 1972.

(SEAL)
Attest:

EDWARD M. FLETCHER, JR.                 ROBERT GOTTSCHALK
Attesting Officer                       Commissioner of Patents